US008810950B1

(12) United States Patent
Kalluri et al.

(10) Patent No.: US 8,810,950 B1
(45) Date of Patent: Aug. 19, 2014

(54) DATA SEQUENCE DETECTION IN BAND-LIMITED CHANNELS USING TWO STREAM DETECTOR ARCHITECTURE (71) Applicant: LSI Corporation, San Jose, CA (US)

(72) Inventors: Madhusudan Kalluri, San Jose, CA (US); Sathiyanarayanan Sampath Kumar, San Jose, CA (US); Jianqing Chen, San Jose, CA (US); Lei Chen, San Jose, CA (US); Johnson Yen, San Jose, CA (US); Sancar K. Olcay, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/842,259

(22) Filed: Mar. 15, 2013

(51) Int. Cl.
*G11B 5/035* (2006.01)
*H03H 7/30* (2006.01)
*H03H 7/40* (2006.01)
*H03K 5/159* (2006.01)

(52) U.S. Cl.
CPC .................................... *G11B 5/035* (2013.01)
USPC .......................................... 360/65; 375/232

(58) Field of Classification Search
None
See application file for complete search history.

(56) References Cited

U.S. PATENT DOCUMENTS

| 5,961,658 | A | 10/1999 | Reed et al. |
| 7,788,572 | B1 | 8/2010 | Ulriksson |
| 8,010,883 | B1 | 8/2011 | Song et al. |
| 8,090,059 | B1 | 1/2012 | Song et al. |
| 8,160,181 | B1 | 4/2012 | Song et al. |
| 8,238,500 | B2 | 8/2012 | Erden |
| 8,359,527 | B1 | 1/2013 | Song et al. |
| 8,625,217 | B1 * | 1/2014 | Yang et al. ...................... 360/39 |
| 2004/0181732 | A1 | 9/2004 | McEwen et al. |
| 2005/0169412 | A1 | 8/2005 | Yang et al. |
| 2006/0072379 | A1 * | 4/2006 | Ochi .......................... 369/30.01 |
| 2011/0080668 | A1 | 4/2011 | Parthasarathy et al. |
| 2012/0269254 | A1 | 10/2012 | Erden |
| 2013/0235484 | A1 * | 9/2013 | Liao et al. ....................... 360/39 |
| 2013/0339827 | A1 * | 12/2013 | Han et al. ...................... 714/799 |

* cited by examiner

*Primary Examiner* — Regina N Holder
(74) *Attorney, Agent, or Firm* — Ryan, Mason & Lewis, LLP (57) ABSTRACT

A method for data sequence detection includes generating a first sample stream, equalizing the first sample stream to generate a first equalized sample stream, and buffering the first equalized sample stream. The first sample stream is interpolated to generate a second sample stream. The second sample stream is equalized to generate a second equalized sample stream. In a first processing path, the samples of the buffered first equalized sample stream are filtered using a first noise predictive filter bank to generate a first set of noise sample streams. In a second parallel processing path, the samples of the buffered first equalized sample stream are interpolated using a second interpolation filter to generate an interpolated sample stream and the interpolated sample stream is filtered to generate a second set of noise sample streams. The first equalized sample stream and the second equalized sample stream are processed to generate adapted filter coefficients for the second interpolation filter. The first and second set of noise sample streams are diversity combined to generate a set of combined noise sample streams. A data sequence is detected using the set of combined noise sample streams.

22 Claims, 6 Drawing Sheets

DATA SEQUENCE DETECTION IN BAND-LIMITED CHANNELS USING TWO STREAM DETECTOR ARCHITECTURE

FIELD OF THE INVENTION

The field generally relates to data sequence detection techniques and, in particular, to circuits and methods for implementing two stream diversity-based data sequence detection in band-limited channels, such as a read channel in a magnetic disk storage system.

BACKGROUND

Storage devices such as hard disk drives are used to provide non-volatile data storage in a wide variety of different types of data processing systems. A typical hard disk drive comprises a spindle that holds one or more flat circular storage disks, also referred to as platters. Each storage disk comprises a substrate made from a non-magnetic material, such as aluminum or glass, which is coated with one or more thin layers of magnetic material. In a magnetic storage system, a digital data sequence is written as a sequence of magnetic flux transitions onto the surface of the magnetic medium in concentric, radially spaced tracks at a predetermined baud rate. The sequence of magnetic flux transitions corresponding to the digital data sequence are written onto the surface of the magnetic medium with a read/write head coil. The digital data sequence serves to modulate current in the read/write head coil. When reading the recorded data from the magnetic medium, the read/write head passes over the surface of the magnetic medium and transduces magnetic flux transitions into pulses of alternating magnetic polarity in a continuous time analog read signal. These pulses are decoded by read channel circuitry to reproduce the digital data sequence. Within increasing data density, magnetic flux transitions are packed closer together on the magnetic medium. As a result, adjacent magnetic pulses begin to overlap with one another, causing distortions, generally known as intersymbol interference ("ISI"), in the read signal. ISI can lead to detection errors.

SUMMARY

In an embodiment of the invention, a method is provided for detecting a data sequence. The method includes generating a first sample stream, wherein the first sample stream is a time-sequenced digital signal associated with samples of an analog signal. The first sample stream is equalized using a first equalization filter to generate a first equalized sample stream. The first equalized sample stream is buffered. The first sample stream is interpolated using a first interpolation filter to generate a second sample stream. The second sample stream is a phase-shifted version of the first sample stream. The second sample stream is equalized using a second equalization filter to generate a second equalized sample stream. In a first processing path, the samples of the buffered first equalized sample stream are filtered using a first noise predictive filter bank to generate a first set of noise sample streams. In addition, in a second processing path parallel to the first processing path, the samples of the buffered first equalized sample stream are interpolated using a second interpolation filter to generate an interpolated sample stream and the interpolated sample stream is filtered using a second noise predictive filter bank to generate a second set of noise sample streams. The first equalized sample stream and the second equalized sample stream are processed to generate adapted filter coefficients for the second interpolation filter in the second processing path. The first and second set of noise sample streams are diversity combined to generate a set of combined noise sample streams. A data sequence is detected using the set of combined noise sample streams.

Other embodiments of the invention will become apparent.

WRITTEN DESCRIPTION

Figure 1:
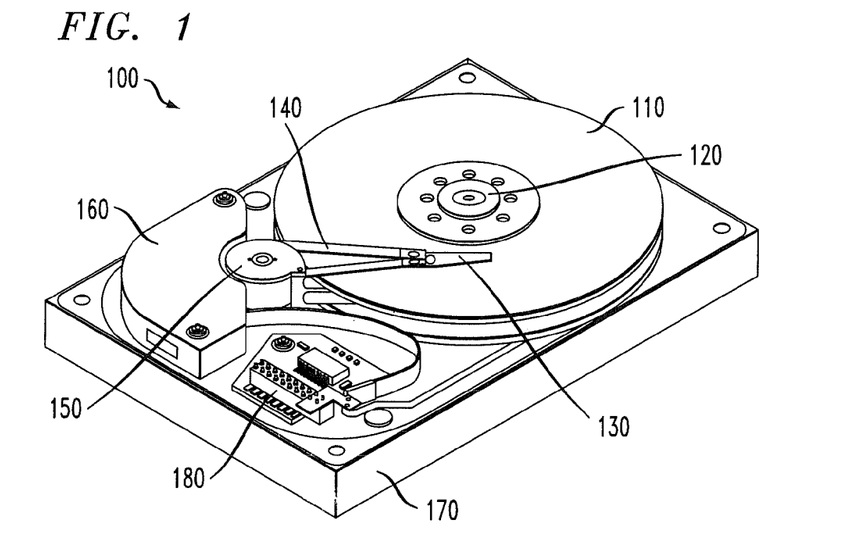
FIG. 1 shows a perspective view of a disk-based storage device according to an embodiment of the invention.

FIG. 1 shows a storage device 100 according to an embodiment of the invention. The storage device 100 comprises a hard disk drive that includes a storage disk 110. The storage disk 110 has a storage surface coated with one or more magnetic materials that are capable of storing data bits in the form of respective groups of media grains oriented in a common magnetization direction (e.g., up or down). The storage disk 110 is connected to a spindle 120. The spindle 120 is driven by a spindle motor (not explicitly shown in FIG. 1) to spin the storage disk 110 at high speed. Data is read from and written to the storage disk 110 via a read/write head 130 that is mounted on a positioning arm 140. An actuator motor 150 (or voice coil motor) is connected to one end of the positioning arm 140 opposite the read/write head 130. The actuator motor 150 comprises a permanent magnet and a moving coil motor, which operate to controllably swing the read/write head 130 into a desired position across the magnetic surface of the storage disk 110 as the storage disk 110 spins by operation of the spindle motor. The storage device 100 further comprises an upper housing 160 which houses driver circuitry and other mechanical and electronic components for controlling the actuator motor 150 and the spindle motor. The upper housing 160 further comprises control circuitry such as preamplifier electronics that are mounted proximate to the pivot location of the actuator motor 150. Thin printed-circuit cables are used to connect the read/write heads 130 to the preamplifier electronics mounted in the housing 160.

The storage device 100 further comprises other control circuitry mounted on one or more printed circuit boards that are disposed in a lower housing 170 of the storage device 100. The control circuitry comprises various drive electronics, signal processing electronics, and associated processing and memory circuitry, to control the writing and reading of data to and from the storage disk, as well as additional or alternative elements that are utilized to drive and control the spindle and actuator motors. A connector 180 is used to connect the storage device 100 to a host computer or other related processing device.

FIG. 1 shows an embodiment of the invention with one instance of each of the single storage disk 110, read/write head 130, and positioning arm 140. In an alternate embodiment of the invention, the storage device 100 comprises multiple instances of one or more of these or other drive components. For example, in an alternative embodiment of the invention, the storage device 100 comprises multiple storage disks attached to the same spindle such that each storage disk rotates at the same speed, as well as multiple read/write heads and associated positioning arms coupled to one or more actuators.

A read/write head as that term is broadly used herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads. Such heads may comprise, for example, write heads with wrap-around or side-shielded main poles, or any other types of heads suitable for recording and/or reading data on a storage disk.

In addition, the storage device 100 as illustrated in FIG. 1 may include other elements in addition to, or in place of, those specifically shown, including one or more elements of a type commonly found in conventional storage devices. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

Figure 2:
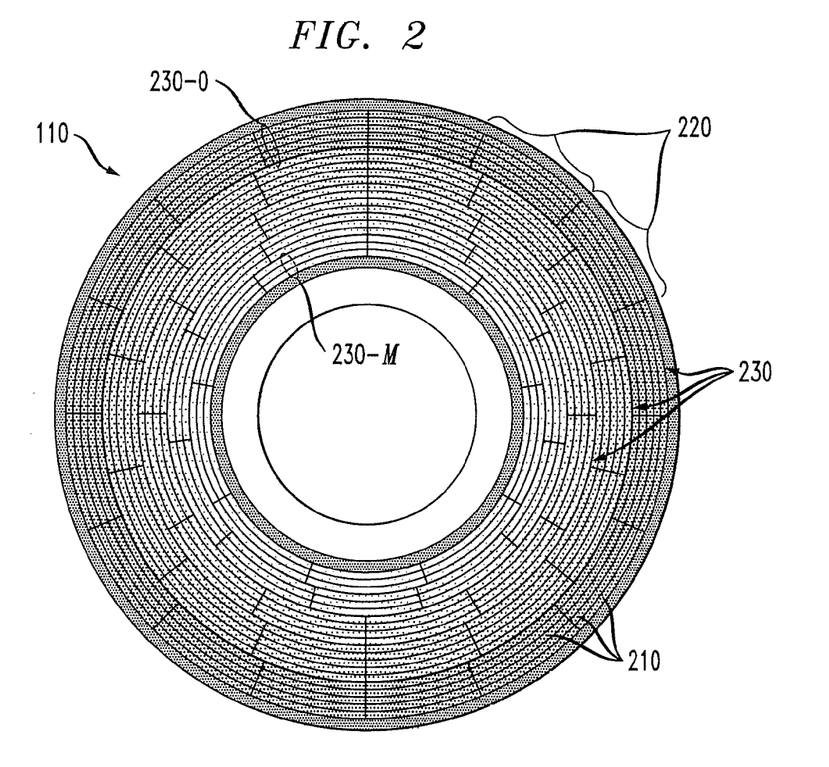
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 that are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head 130 is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Data bit density is generally constant across the entire storage surface of the storage disk 110, which results in higher data transfer rates at the outer zones. Accordingly, the outermost annular zone 230-0 of the storage disk has a higher average data transfer rate than the innermost annular zone 230-M of the storage disk. The average data transfer rates may differ between the innermost and outermost annular zones in a given embodiment of the invention by more than a factor of two. For example, in one embodiment of the invention, the outermost annular zone may have a data transfer rate of approximately 2.3 Gigabits per second (Gb/s), while the innermost annular zone has a data transfer rate of approximately 1.0 Gb/s. In such an implementation, the hard disk drive may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

The storage disk 110 may be assumed to include a timing pattern formed on its storage surface. Such a timing pattern may comprise one or more sets of servo address marks (SAMs) or other types of servo marks formed in particular sectors in a conventional manner SAMs may therefore be viewed as an example of what are more specifically referred to herein as servo marks. The particular data transfer rates and other features described above are presented for purposes of illustration only, and should not be construed as limiting in any way. A wide variety of other data transfer rates and storage disk configurations may be used in other embodiments.

Figure 3:
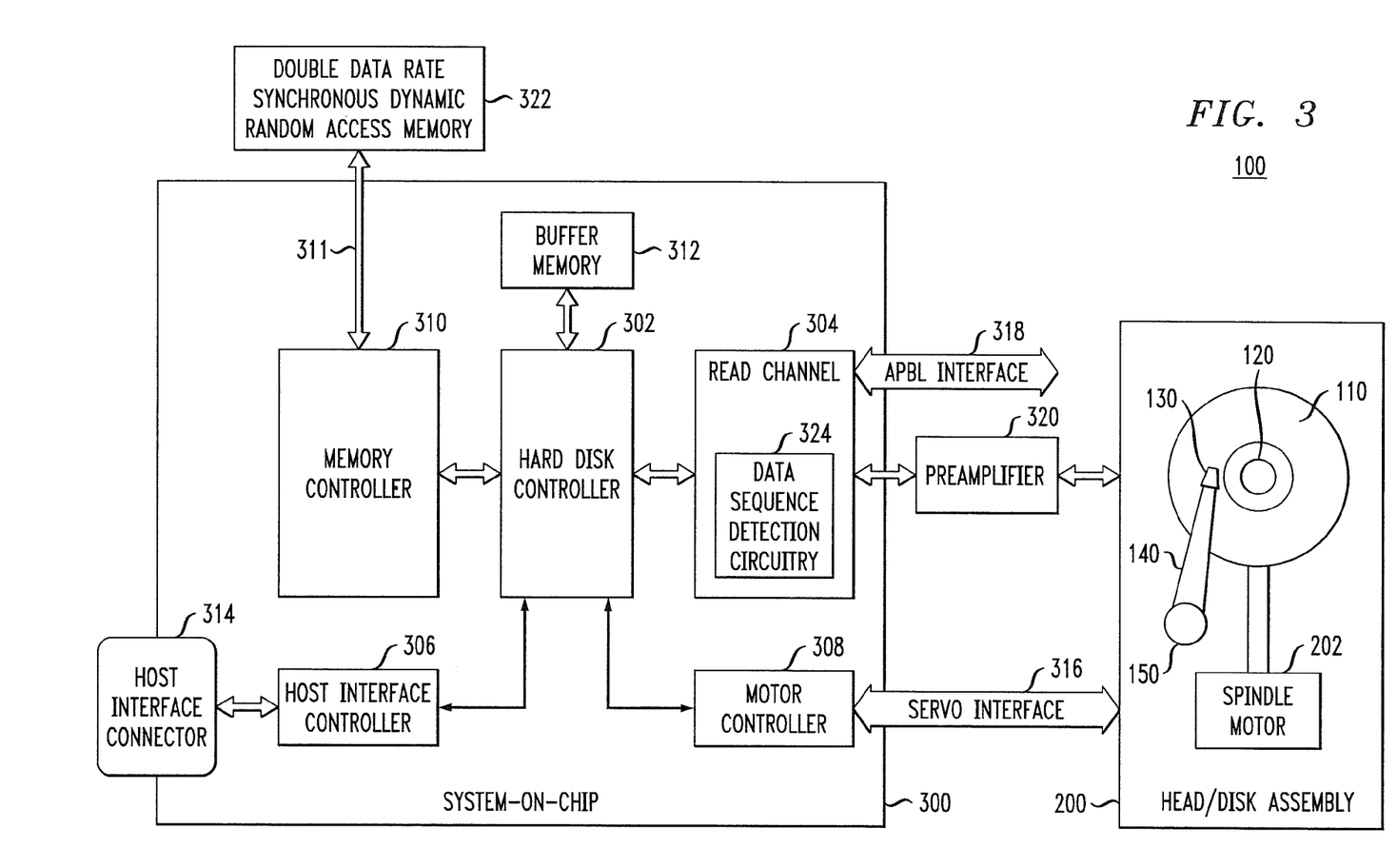
FIG. 3 schematically illustrates a storage device according to another embodiment of the invention.

FIG. 3 schematically illustrates a storage device according to another embodiment of the invention. In particular, FIG. 3 illustrates an embodiment of the storage device 100 of FIG. 1 in greater detail. As shown in FIG. 3, the storage device 100 comprises a read/write head and disk assembly 200 and a system-on-chip 300. The read/write head and disk assembly 200 comprises components such as a storage disk 110, spindle 120, read/write head 130, positioning arm 140, actuator motor 150, and a spindle motor 202, as discussed above with reference to the embodiment of FIG. 1. The system-on-chip 300 comprises various integrated circuits such as a hard disk controller 302, a read channel integrated circuit 304, a host interface controller 306, a motor controller 308, a memory controller 310, and a buffer memory 312. The system-on-chip 300 further comprises a plurality of interfaces such as a host interface connector 314, a servo interface 316, and a bidirectional APBL (Advanced Peripheral Bus-Light) interface 318. The storage device 100 further comprises a preamplifier 320 and an external random access memory 322.

The host interface connector 314 represents a physical connector (e.g., connector 180 as shown in FIG. 1) and associated input/output (I/O) bus wiring that connects the storage device 100 to a host system, device, I/O bus, or other components of a data processing system. The I/O data is moved to and from the storage device 100 through the host interface connector 314 under control of the host interface controller 306. The host interface controller 306 implements communication protocols for communicating with a host system or device and controlling and managing data I/O operations, using one or more known interface standards. For example, in one or more alternative embodiments of the invention, the host interface connector 314 and host interface controller 306 are implemented using one or more of Small Computer interface (SCSI), Serial Attached SCSI (SAS), Serial Advanced Technology Attachment (SATA) and/or Fibre Channel (FC) interface standards, for example.

The hard disk controller 302 controls the overall operations of writing and reading data to and from the storage disk 110.

In one embodiment of the invention, the hard disk controller 302 is an ARM (Advanced Reduced instruction set computing Machine). In other embodiments, the hard disk controller 302 may comprise other known architectures suitable for controlling hard disk operations. The read channel integrated circuit 304 encodes and decodes data that is written to and read from the storage disk 110 using the read/write head 130. The read channel integrated circuit 304 comprises data sequence detection circuitry 324 for reproducing and detecting a digital data sequence read from the storage disk 110. The data sequence detection circuitry 324 implements circuits and methods as discussed below with reference to FIGS. 4, 5 and 6 according to embodiments of the invention. The read channel integrated circuit 304 further implements other types of circuitry that is commonly implemented to process data that is read from and written to the storage disk 110. The preamplifier 320 is connected between the read channel integrated circuit 304 and the read/write head 130. The preamplifier 320 amplifies an analog signal output from the read/write head 130 for input to the read channel integrated circuit 304 and provides a voltage bias for a magnetic sensor of the read/write head 130. The APBL interface 318 is used to access internal registers of the read channel integrated circuit 304. Depending on the storage system architecture, a controller (e.g., on-chip controller, off-chip controller, or remote controller that is external to the storage device 100) can be connected to the read channel integrated circuit 304 via the APBL interface 318, as necessary, to access internal registers and program the read channel integrated circuit 304.

The motor controller 308 is connected to the head/disk assembly 200 via the servo interface 316. The motor controller 308 sends control signals to the spindle motor 202 and actuator motor 150 through the servo interface 316 during read and write operations to spin the storage disk 110 and move the read/write head 130 into a target position. In particular, for a typical read operation, signals for performing a read operation are received through the host interface connector 314 and sent to the hard disk controller 302 through the host interface controller 306. The hard disk controller 302 processes the read signals for performing the read operation and then sends control signals to the motor controller 308 for controlling the actuator motor 150 and spindle motor 202 for the read operation. Additionally, the hard disk controller 302 sends the processed read signals to the read channel integrated circuit 304, which are then sent to the actuator motor 150 through the preamplifier 320 to perform the read operation. The actuator motor 150 positions the read/write head 130 over a target data track on storage disk 110 in response to control signals received by the motor controller 308 and the read channel integrated circuit 304. The motor controller 308 also generates control signals to drive the spindle motor 202 to spin the storage disk 110 under the direction of the hard disk controller 302. The spindle motor 202 spins the storage disk 110 at a determined spin rate.

When the read/write head 130 is positioned adjacent the target data track, magnetic signals representing data on the storage disk 110 are sensed by read/write head 130 as the storage disk 110 is rotated by the spindle motor 202. The sensed magnetic signals are provided as continuous, minute analog signals representative of the magnetic data on the storage disk 110. The analog signals are transferred from the read/write head 130 to the read channel integrated circuit 304 via the preamplifier 320. The preamplifier 320 amplifies the analog signals accessed from storage disk 110, and the read channel integrated circuit 304 decodes and digitizes the received analog signals to recreate the information originally written to the storage disk 110. The data read from the storage disk 110 is then output to a host system or device through the host interface controller 306 and host interface connector 314 under control of the hard disk controller 302.

A write operation is substantially the opposite of a read operation. For example, in one embodiment, write signals for performing write operations are received through the host interface connector 314, wherein the write signals represent commands to perform a write operation and/or data that is to be written to the storage disk 110. The write signals are sent to the hard disk controller 302 through host interface controller 306. The hard disk controller 302 processes the write signals for performing the write operation and then sends control signals to the motor controller 308 for controlling the actuator motor 150 and spindle motor 202 for the write operation. Additionally, the hard disk controller 302 sends the processed write signals (and formatted data) to the read channel integrated circuit 304, wherein the formatted data to be written is encoded. The write signals (control and data) are then sent to the actuator motor 150 through the preamplifier 320 to perform a write operation by writing data to the storage disk 110 via the read/write head 130.

In the embodiment of FIG. 3, the external random access memory 322 is an external memory relative to the system-on-chip 300 and other components of the storage device 100, but is nonetheless internal to the storage device 100. In one embodiment, the external random access memory 322 is a double data rate synchronous dynamic random access memory, although a wide variety of other types of memory may be used in alternate embodiments. The external random access memory 322 is initialized by the memory controller 310. The memory controller 310 performs signaling control of the external random access memory 322 on behalf of the hard disk controller 302, whereby initialization of the external random access memory 322 is implemented via the programming of configuration registers in the memory controller 310 by the disk controller 302. In operation, the memory controller 310 generates internal clock pulses for synchronizing data write operations and read operations of the external random access memory 322. The internal clock signals and data are transmitted to and from the external random access memory 322 via a data/signal bus 311.

In one embodiment of the invention, the external random access memory 322 serves as a buffer memory for data transfers between a host system/device and the storage device 100. For example, the read and or write signals (as discussed above) that are received by the hard disk controller 302 from the host interface controller 306 can be temporarily stored in the external random access memory 322 before being processed by the hard disk controller 302 and the read channel integrated circuit 304, for example. Moreover, data that is read out from the storage disk 110 may be temporarily stored in the external random access memory 322 before being packaged and output to a host system/device by operation of the hard disk controller 302 and the host interface controller 306. This buffering optimizes the throughput of the storage device 100 by matching disparate processing and data transmission speeds as data passes to and from the storage disk 110. The buffer memory 312 comprises on-chip memory that is used by the hard disk controller to temporarily store data and/or instructions for performing read/write operations. In one embodiment of the invention, the internal buffer memory 312 is used by the system-on-chip 300 as a buffer memory for normal functional mode operations. In one embodiment of the invention, the internal buffer memory 312 is used as a LLI (Long Latency Interface) buffer memory for normal functional mode operations of the system-on-chip 300.

It is to be understood that the external random access memory 322, system-on-chip 300 and preamplifier 320 shown in FIG. 3 collectively represent one embodiment of "control circuitry" as that term is utilized herein. Numerous alternative embodiments of "control circuitry" include a subset of the components 300, 320 and 322 or portions of one or more of these components. For example, the system-on-chip 300 itself may be viewed as an example of "control circuitry" to process data received from and supplied to the read/write head 130 and to control positioning of the read/write head 130 relative to the storage disk 110. Certain operations of the system-on-chip 300 in the storage device 100 of FIG. 3 may be directed by the disk controller 302, which executes code stored in the external random access memory 322 and/or the internal buffer memory 312, for example. Thus, at least a portion of the control functionality of the storage device 100 may be implemented at least in part in the form of software code.

Furthermore, although the embodiment of FIG. 3 illustrates various components of the system-on-chip 300 being implemented on a single integrated circuit chip, the system-on-chip 300 may include other integrated circuits, such as the external random access memory 322 or the preamplifier 320, or portions thereof. Moreover, the disk controller 302, host interface controller 306, and motor controller 308, may be implemented using suitable integrated circuit architectures such as microprocessor, digital signal processor (DSP), application-specific integrated circuit (ASIC), or field-programmable gate array (FPGA), or other types of integrated circuit architectures.

As noted above, the read channel integrated circuit 304 comprises data sequence detection circuitry 324 for reproducing and detecting a digital data sequence read from the storage disk 110. In a band limited channel, such as a read channel in a magnetic storage system, one embodiment of the data sequence detection circuitry 324 implements a multi stream approach (e.g., first and second signal processing paths P1 and P2, as shown in FIG. 5) which takes into consideration different analog-to-digital sampling phases, equalization filtering, PR (partial response) targets, and noise predictive filtering, to enable the use of diversity in the form of different residual ISI, noise components and estimations for a same sequence, to improve the data sequence detection for a baud rate system. For example, the data sequence detection circuitry 324 implements circuits and methods as discussed below with reference to FIGS. 4, 5 and 6 according to embodiments of the invention.

Figure 4:
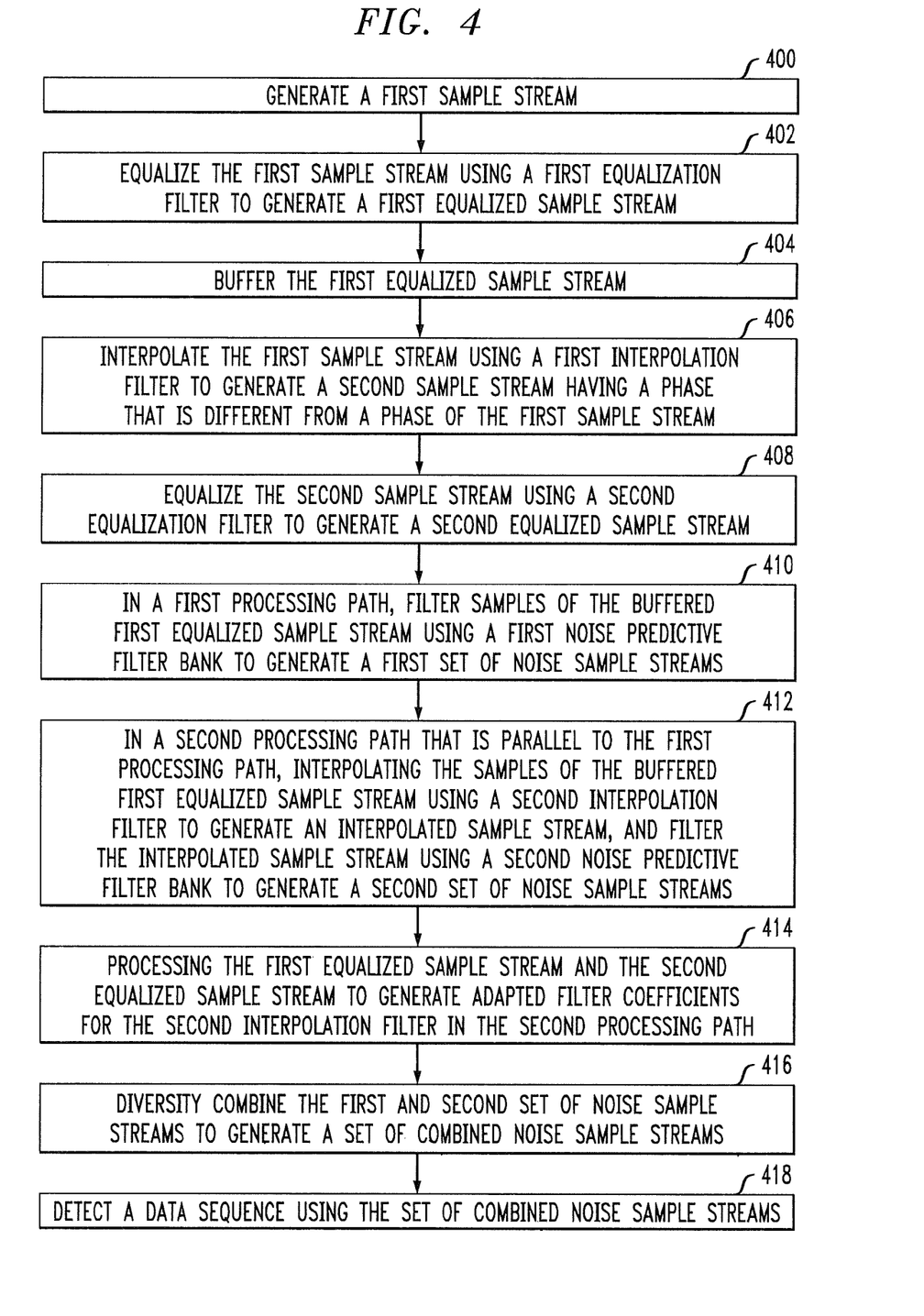
FIG. 4 illustrates a method for data sequence detection according to an embodiment of the invention.
Figure 5:
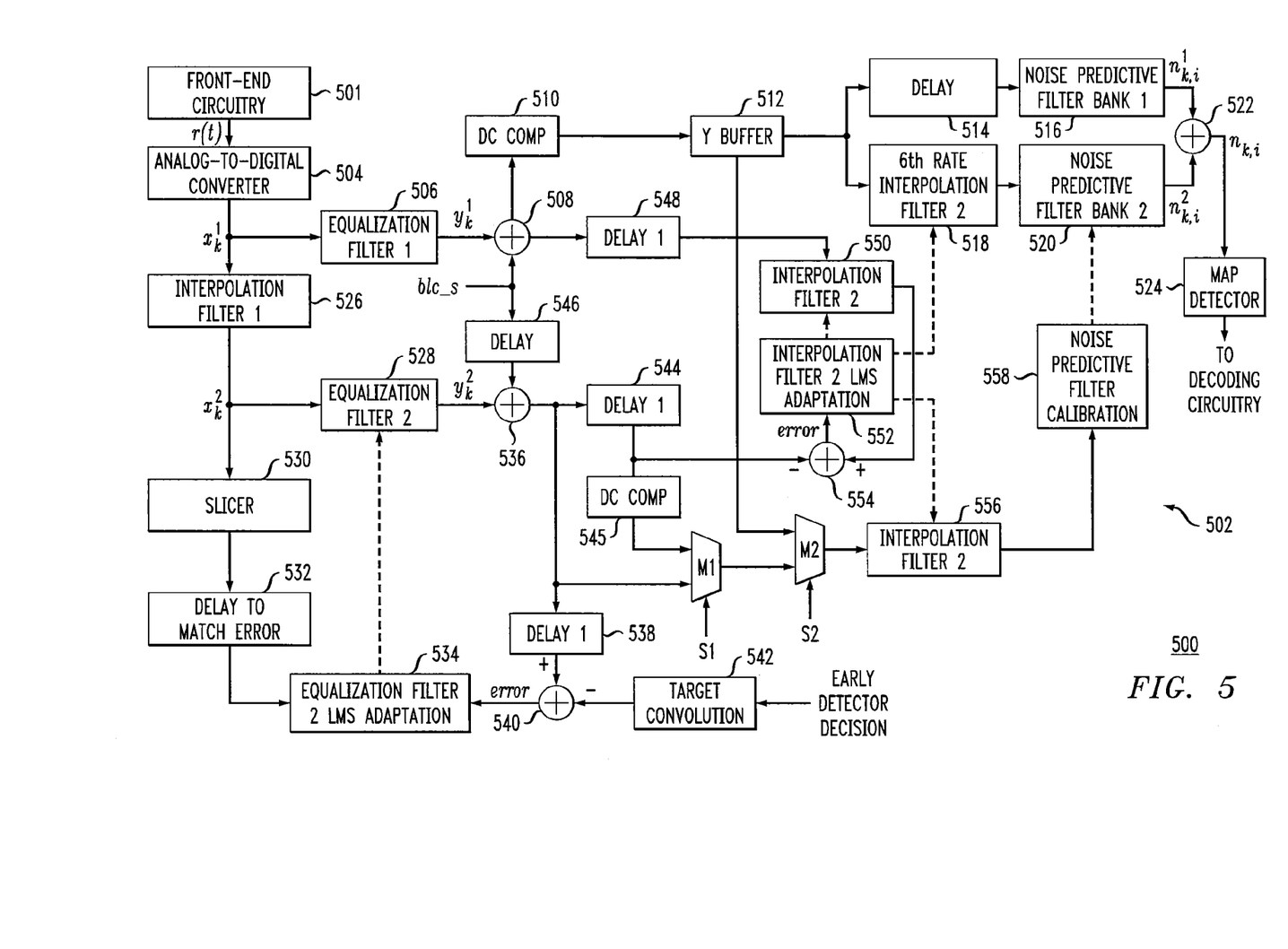
FIG. 5 is a block diagram of a circuit for reading data from a storage medium, which comprises a data sequence detection circuit according to an embodiment of the invention.

FIG. 4 illustrates a method for data sequence detection according to an embodiment of the invention. An initial step includes generating a first sample stream (block 400). The first sample stream is a time-sequenced digital signal associated with samples of an analog signal. In the context of a read channel for a storage system as shown in FIG. 3, the analog signal is an analog read channel signal containing data read from a storage disk. The first sample stream is equalized using a first equalization filter to generate a first equalized sample stream (block 402). The first equalized sample stream is buffered (block 404). The first sample stream is interpolated using a first interpolation filter to generate a second sample stream (block 406). The second sample stream is a phase-shifted version of the first sample stream. The second sample stream is equalized using a second equalization filter to generate a second equalized sample stream (block 408).

In a first processing path, the samples of the buffered first equalized sample stream are filtered using a first noise predictive filter bank to generate a first set of noise sample streams (block 410). In addition, in a second processing path parallel to the first processing path, the samples of the buffered first equalized sample stream are interpolated using a second interpolation filter to generate an interpolated sample stream and the interpolated sample stream is filtered using a second noise predictive filter bank to generate a second set of noise sample streams (block 412). The first equalized sample stream and the second equalized sample stream are processed to generate adapted filter coefficients for the second interpolation filter in the second processing path (block 414). The first and second set of noise sample streams are diversity combined to generate a set of combined noise sample streams (block 416). A data sequence is detected using the set of combined noise sample streams (block 418).

FIG. 5 is a block diagram of a circuit for reading data from a storage medium, which comprises a data sequence detection circuit according to an embodiment of the invention. FIG. 5 illustrates one embodiment of a circuit for implementing the method discussed above with reference to FIG. 4. In particular, FIG. 5 is a block diagram of read channel 500 for reading data from a storage disk comprising front-end circuitry 501 and data sequence detection circuitry 502. In general, the front-end circuitry 501 includes circuit components such as read head circuitry (which is part of a read/write head 130), a preamplifier (e.g., preamplifier 320, FIG. 3), a VGA (variable gain amplifier) and a continuous time filter. For a read operation, the read head and preamplifier convert data and other information stored on a storage disk into an analog read signal using known techniques. The VGA adjusts the amplitude of the analog read signal to a value that is suitable for a dynamic range of a downstream analog-to-digital converter (ADC). The continuous time filter is a pulse-shaping filter, which serves to filter the gain-adjusted analog read signal for anti-aliasing purposes and to provide a proper high frequency boost, and outputs a filtered analog read signal, r(t). In one embodiment, the continuous time filter is a low-pass filter that filters the analog read signal before it is sampled to reduce the effects of aliasing. The VGA and continuous time filter process the analog waveform to a desired pulse amplitude and bandwidth for conversion to a digital signal.

In general, the data sequence detection circuitry 502 comprises various integrated circuits including an analog-to-digital converter 504, a first equalization filter 506, an adder 508, a DC compensation block 510, a Y buffer 512, a delay block 514, a first noise predictive filter bank 516, an interpolation filter 518, a second noise predictive filter bank 520, a diversity combiner circuit 522, a MAP (Maximum a Posteriori) detector 524, an interpolation filter 526, an equalization filter 528, a slicer 530, a delay block 532, an equalization filter LMS (least mean squares) adaptation engine 534, an adder 536, a delay block 538, and adder 540, a target convolution block 542, delay blocks 544, 546, 548, an interpolation filter 550, an interpolation filter LMS adaptation engine 552, an adder 554, an interpolation filter 556, and a noise predictive filter calibration engine 558.

The analog-to-digital converter 504 receives an analog read signal r(t) from the front-end circuitry 501, and samples the analog read signal r(t) in response to a sample clock to convert the analog read signal r(t) into a digital signal. In particular, the analog-to-digital converter 504 samples the analog read signal r(t) and generates a first sample stream, $x_k^1$, which is a time-sequenced digital signal associated with samples of the analog read signal r(t). The first sample stream $x_k^1$ may comprise a number of samples. In one embodiment of the invention, the analog-to-digital converter 504 has a programmable sampling phase that can be selected based on an equalization target of equalization filters used in the data sequence detection circuitry 502.

The first sample stream $x_k^1$ is input to the equalization filter 506, which equalizes the sample stream $x_k^1$ to a specified partial response target (e.g., PR4, EPR4, E²PR4, etc.) that represents or approximates a frequency response of the read back signal of the data that is stored on the storage disk. In one embodiment, the equalization filter 506 is a digital finite impulse response filter that is configured such that the spectrum of the equalization filter output $y_k^1$ has a shape that is similar to that of the frequency response of the partial response target. In other embodiments of the invention, other known types of equalization circuits and methods can be implemented instead of or in combination with digital finite impulse response filters to equalize the sample stream.

In one embodiment of the invention, the first equalized sample stream) $y_k^1$ is input to the adder 508. The adder 508 adds a base line compensation signal, blc_s, to samples of the first equalized sample stream $y_k^1$ for amplitude adjustment, as is known in the art. The adder 508 is an optional component such that in another embodiment of the invention, the adder 508 is omitted and no baseline compensation is applied to the first equalized sample stream $y_k^1$. The Y buffer 512 temporarily stores samples of the first equalized sample stream $y_k^1$. The DC compensation block 501 is an optional element which is implemented in one embodiment of the invention to add DC compensation to the first equalized sample stream $y_k^1$ before being stored in the Y buffer 512.

The circuit components 514, 516, 518, 520, 522 and 524 are considered a "backend" portion of the data sequence detection circuitry 502, while the other circuit components shown in FIG. 5 are considered a "frontend" portion of the data sequence detection circuitry 502. The backend portion of the data sequence detection circuitry 502 comprises a plurality of parallel processing paths. FIG. 5 illustrates a first processing path comprising the delay block 514 and the first noise predictive filter bank 516, and a second processing path parallel to the first processing path, wherein the second processing path comprises the interpolation filter 518 the second noise predictive filter bank 520.

In the first processing path, samples of the buffered first equalized sample stream $y_k^1$ are output from the Y buffer 512, delayed by the delay block 514 and then input to the first noise predictive filter bank 516. The first noise predictive filter bank 516 filters the samples of the buffered first equalized sample stream and generates a first set of noise sample streams. In one embodiment, the first noise predictive filter bank 526 comprises a plurality (bank) of noise predictive finite impulse response filters, wherein each noise predictive finite impulse response filter performs noise predictive filtering on the buffered samples of the first equalized sample stream $y_k^1$ to yield a noise sample stream, $n_{k,i}^1$, for an $i^{th}$ data pattern, which is given by the following equation:

$$n_{k,i}^1 = \sum_{j=0}^{L-1} p_j^{1,i} \cdot y_{k-j}^1 - bias_{1,i} \tag{1}$$

In equation (1), L is a number of coefficients of each predictive filter, $p_j^{1,i}$ is the $j^{th}$ coefficient of the noise predictive filter in the first signal processing path corresponding to the $i^{th}$ data pattern, and $bias_{1,i}$ is the prediction bias.

In the second processing path, samples of the buffered first equalized sample stream $y_k^1$, are output from the Y buffer 512 and input to the interpolation filter 518. The interpolation filter 518 interpolates the buffered samples of the first equalized sample stream to generate an interpolated sample stream, which is input to the second noise predictive filter bank 520. The second noise predictive filter bank 520 filters the interpolated sample stream output from the interpolation filter 518 and generates a second set of noise sample streams $n_{k,i}^2$. In one embodiment, the second noise predictive filter bank 520 comprises a plurality (bank) of noise predictive finite impulse response filters, wherein each noise predictive finite impulse response filter performs noise predictive filtering on the interpolated equalized sample stream, $y_k^2$, to yield a noise sample stream, $n_{k,i}^2$, for the $i^{th}$ data pattern, which is given by the following equation.

$$n_{k,i}^2 = \sum_{j=0}^{L-1} p_j^{2,i} \cdot y_{k-j}^2 - bias_{2,i} \tag{2}$$

In equation (2), L is number of coefficients of each predictive filter, $p_j^{2,i}$ is the $j^{th}$ coefficient of the noise predictive filter in the second signal processing path corresponding to the $i^{th}$ data pattern, and $bias_{2,i}$ is the prediction bias.

The first and second noise sample streams $n_{k,i}^1$ and $n_{k,i}^2$ are input to the diversity combiner 522 where the first and second noise sample streams are combined to generate composite noise sample stream $n_{k,i}$ for each data pattern. The composite noise sample stream $n_{k,i}$ is input to the MAP detector 524 which uses digital-signal processing techniques to determine the binary bit pattern represented by the digital read signal. The MAP detector 524 may implement one of a plurality of well-known discrete time sequence detection methods for performing data sequence detection. The MAP detector 524 provides the binary data represented by the digital signal to decoder circuitry which removes parity bits from the binary bit pattern and performs decoding (e.g., RLL decoding) of the encoded symbols into the actual binary data. The output of the decoding circuitry provides the actual binary data to the disk controller for output to a host device.

In one embodiment of the invention, the backend detection process operates in ¼-rate clock cycle architecture wherein the first and second processing paths concurrently process 6 buffered samples on every quarter-rate clock cycle. In one embodiment of the invention, the backend block of circuit components 514, 516, 518, 520, 522 and 524 is duplicated three times, such that each of block of circuit components 514, 516, 518, 520, 522 and 524 processes 6 different sets of buffered samples. In this regard, the backend circuitry processes 18 buffered samples in each quarter clock cycle. Therefore, in one embodiment of the invention as shown in FIG. 5, the interpolation filter 518 (in each duplicated backend block of components) is a $6^{th}$ rate interpolation filter.

In one embodiment of the invention, the interpolation filter 518 and second noise predictive filter bank 520 in each (e.g., 3) of the second processing paths are dynamically adapted by second stream processing in the front-end circuitry of the data sequence detection circuit 502. In particular, to implement second stream processing, the first sample stream $x_k^1$ is input to the interpolation filter 526 to generate a second sample stream $x_k^2$. The interpolation filter 526 interpolates the first sample stream $x_k^1$ by phase-shifting the first sample stream $x_k^1$ by a pre-programmed phase shift amount, e.g., 0.25T, 0.5T, 0.75T, etc., where T is the period of the sample stream $x_k^1$. In one embodiment, the interpolation filter 526 generates the second sample stream $x_k^2$ having a phase shift of 0.5T away from the first sample stream, $x_k^1$. The second sample stream $x_k^2$ is input to the equalization filter 528 which equalizes the second sample stream, $x_k^2$, to a specified partial response target (e.g., PR4, EPR4, E²PR4, etc.), and generates a second equalized sample stream, $y_k^2$. In one embodiment, the equalization filter 528 is a digital finite impulse response filter. In one embodiment, the equalization target of the equalization filter 528 is different from the partial response target of the equalization filter 506 in the first stream processing path.

In one embodiment of the invention, the first equalized sample stream $y_k^1$ and the second equalized sample stream $y_k^2$ are processed to generate adapted filter coefficients for the interpolation filter 518. As shown in FIG. 5, the optionally baseline corrected first equalized sample stream $y_k^1$ (output from the adder 508) is input to the delay block 548 and a delayed version of the first equalized sample stream $y_k^1$ is input to an adaptation circuit which comprises the interpolation filter 550, the adaptation engine 552 and the adder 554. The interpolation filter 550 interpolates the first equalized sample stream $y_k^1$ and generates an interpolated sample stream that is input to the adder circuit 554. The interpolation filter 550 has a same response as the interpolation filter 518 in the backend second processing path. The adder circuit 554 generates error signals by subtracting samples of the interpolated sample stream (output from the interpolation filter 550) from samples of the second equalized sample stream $y_k^2$ As shown in FIG. 5, the second equalized sample stream stream $y_k^2$ may be baseline compensated with a delayed version of the blc_s signal that is output from the delay block 546 and added to the second equalized sample stream $y_k^2$ via the adder 536. The second equalized sample stream $y_k^2$ passes through the delay block 522 and then input to the adder 554, which generates error signals as noted above. The adaptation engine 552 generates adapted filter coefficients for the interpolation filter 518 using the error signals and transfers the adapted filter coefficients to the interpolation filter 518 (as indicted by the dashed line connecting to the interpolation filter 518).

In one embodiment of the invention, the adaptation engine 552 implements LMS adaptation to mimic a desired filter by finding the filter coefficients that relate to producing the least mean squares of the error signal (difference between the desired and the actual signal) Furthermore, in one embodiment of the invention as shown in FIG. 5, the interpolation filters 550 and 556 are adapted using the same adapted filter coefficients that were generated for the interpolation filter 518, as both interpolation filters 550 and 556 have a same response as the interpolation filter 518 in the second processing path of the backend.

In another embodiment of the invention as shown in FIG. 5, a second adaptation circuit (which comprises the DC compensation block 545, the first and second multiplexer circuits M1 and M2, the interpolation filter 556 and the noise predictive filter calibration engine 558) is used to process second equalized sample stream $y_k^2$ or the buffered samples of the first equalized sample stream $y_k^1$ (stored in the Y buffer 512) to generate adapted noise predictive filter coefficients for adapting the second noise predictive filter bank 520. As shown in FIG. 5, the first multiplexer circuit M1 is controlled by a first select signal S1 to selectively output either the second equalized sample stream $y_k^2$ or a DC compensated version of the second equalized sample stream $y_k^2$. The output of the first multiplexer circuit M1 is applied to an input of the second multiplexer circuit M2. The second multiplexer circuit M2 is controlled by a second select signal S2 to selectively output either the output of the first multiplexer circuit M1 or buffered samples of the first equalized sample stream $y_k^1$. The select signal S2 selects between decoder based decisions for adapting the second noise predictive filter bank 520 or a detector based decision for adapting the second noise predictive filter bank 520.

The equalized sample stream that is selectively output from the second multiplexer circuit M2 is interpolated by the interpolation filter 556. As noted above, the interpolation filter 556 is adapted using the same adapted filter coefficients that are used to adapt the interpolation filter 518 in the backend, as the interpolation filter 556 has a same response as the interpolation filter 518. The noise predictive filter calibration engine 558 processes the interpolated stream output from the interpolation filter 556 using well known techniques to generate adapted noise predictive filter coefficients, and then transfers the adapted noise predictive filter coefficients to the second noise predictive filter bank 520 in the backend (as indicated by the dashed line connecting the calibration engine 558 to the second noise predictive filter bank 520).

In another embodiment of the invention as shown in FIG. 5, a third adaptation circuit (which comprises the slicer 530, delay block 532, adaptation engine 534, adder 540 and target convolution block 542) is utilized to generate adapted filter coefficients for adapting the equalization filter 528. The second sample stream $x_k^2$ passes through the slicer block 530 which implements known techniques to decide if a given sample is logic "1" or "0". The decision stream output from the slicer block 530 passed through the delay block 532 and then input to the adaptation engine 534. The adaptation engine 534 further receives as input an error signal output from the adder circuit 540. The target convolution circuit 542 convolves early detector decisions (output from a secondary, faster detector circuit that is different from the MAP detector 524) with a target response of the equalization filter 528. The adder circuit 540 subtracts the sample stream of the convolution results from samples of the second equalized sample stream $y_k^2$ to generate the error signals that are input to the adaptation engine 534. In one embodiment of the invention, the adaptation engine 534 uses LMS to generate the adapted filter coefficients for the equalization filter 528 using the error signals and the second sample stream $x_k^2$.

Figure 6:
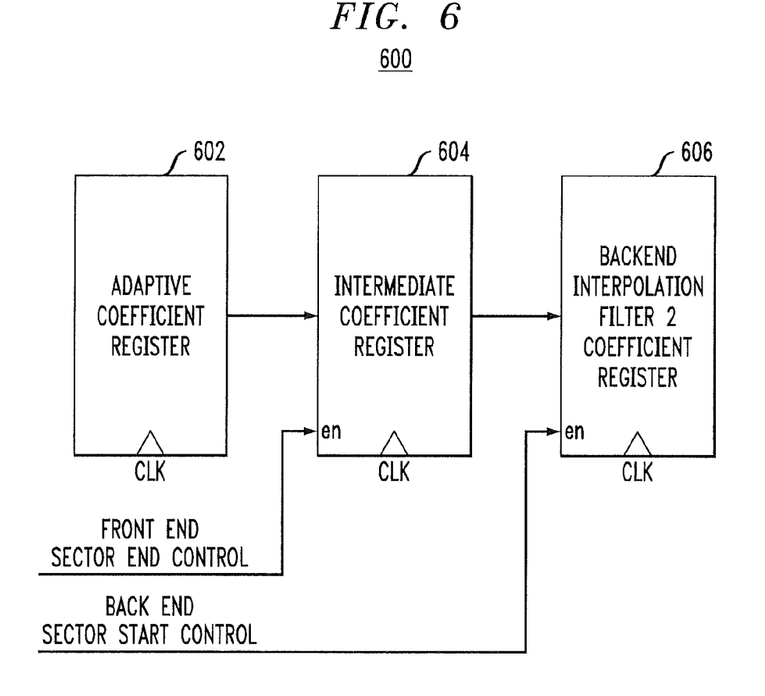
FIG. 6 is a block diagram of a process for asynchronously transferring adapted filter coefficients from a front end to a back end of the data sequence detection circuit of FIG. 5, according to an embodiment of the invention.

FIG. 6 is a block diagram of a process for asynchronously transferring adapted filter coefficients from a front end to a back end of the data sequence detection circuitry of FIG. 5, according to an embodiment of the invention. More specifically, FIG. 6 illustrates a process for asynchronously transferring adapted filter coefficients from the adaptation engine 552 (in the front end) to the interpolation filter 518 (in the back end), according to an embodiment of the invention. As shown in FIG. 6, a process for asynchronously transferring the filter coefficients comprises a frontend adaptive coefficient register 602, an intermediate coefficient register 604, and a backend interpolation filter coefficient register 606. In one embodiment of the invention, the front end coefficient register 602 resides in the adaptation engine 552, the backend coefficient register 606 resides in the interpolation filter 518 and the intermediate coefficient register resides in a circuit block between the front end and backend coefficient registers 602 and 606.

Each of the coefficient registers 602, 604, and 606 is clocked by a same clock signal. The intermediate coefficient register 604 is enabled by a front end sector end control signal and the backend coefficient register 606 is controlled by a back end sector start control signal. The transfer scheme of FIG. 6 takes into account that the sector boundary in the front end and the back end does not align because the backend iterates multiple times and the MAP detector 524 operates with a much higher throughput. In this regard, in the transfer scheme of FIG. 6, the adapted filter coefficients are generated in the front end. At the ends of each front end sector, the front end would store the adapted coefficients in the intermediate coefficient register 604. At the beginning of the MAP detector start, the backend coefficient register 606 receives the adapted coefficients from the intermediate coefficient register 604. When the MAP detector start and the end of the front end sector occurs at the same time, the adapted coefficient data would feed through to the backend coefficient register 606.

In the embodiment of FIG. 5, diversity (the difference in signal and noise) is utilized to enhance data sequence detection. The read channel circuitry 500 of FIG. 5 provides a 2-stream diversity based system which eliminates the need in an iterative detection system to store a large amount of equalized data in the Y buffer before detection. Indeed, in the embodiment of FIG. 5, in a secondary path (second stream) where there is effectively a convolution of the interpolation filter 526 with the equalization filter 528, we effectively construct a new transfer function for the interpolation filter 518 (as well as the interpolation filters 550 and 556) such that: CONV (interpolation filter 526, equalization filter 528)=CONV (equalization filter 506, interpolation filter 518). As such, with the equalization filter 518, we build the second stream from the equalizer which would be suitable for iterative systems with large equalized data memory.

Figure 7:
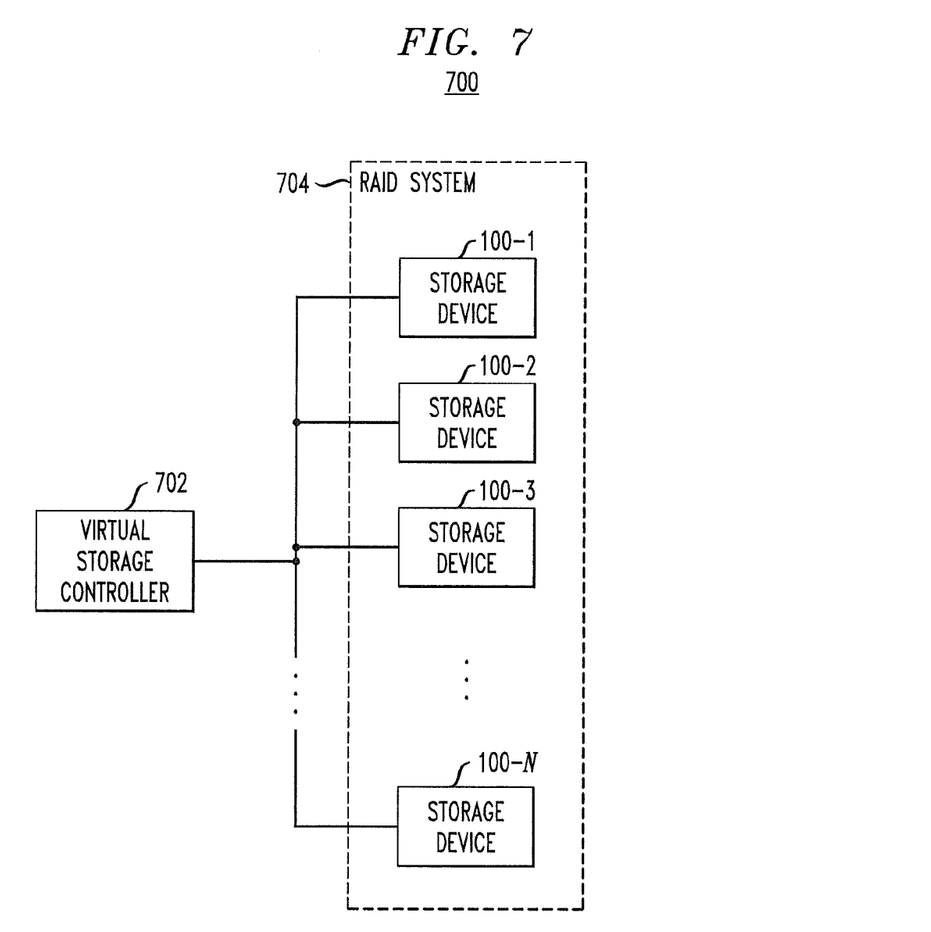
FIG. 7 shows a virtual storage system incorporating a plurality of disk-based storage devices of the type shown in FIG. 1.

Multiple disk-based storage devices 100 may be incorporated into a virtual storage system 700 as illustrated in FIG. 7. The virtual storage system 700, also referred to as a storage virtualization system, illustratively comprises a virtual storage controller 702 coupled to a RAID system 704, where RAID denotes Redundant Array of Independent Disks. The RAID system more specifically comprises N distinct storage devices denoted 100-1, 100-2, . . . , 100-N, one or more of which are assumed to be configured to include embodiments of a system-on-chip with an integrated circuit as shown in FIG. 5 for performing data sequence detection. These and other virtual storage systems comprising hard disk drives or other disk-based storage devices of the type disclosed herein are considered embodiments of the invention. A host processing device may also be an element of a virtual storage system, and may incorporate the virtual storage controller 702.

Although embodiments of the invention have been described herein with reference to the accompanying drawings, it is to be understood that embodiments of the invention are not limited to the described embodiments, and that various changes and modifications may be made by one skilled in the art resulting in other embodiments of the invention within the scope of the following claims.

What is claimed is:

1. A method for detecting a data sequence, comprising:
generating a first sample stream, wherein the first sample stream is a time-sequenced digital signal associated with samples of an analog signal;
equalizing the first sample stream using a first equalization filter to generate a first equalized sample stream;
buffering the first equalized sample stream;
interpolating the first sample stream using a first interpolation filter to generate a second sample stream, wherein the second sample stream is a phase-shifted version of the first sample stream;
equalizing the second sample stream using a second equalization filter to generate a second equalized sample stream;
in a first processing path, filtering samples of the buffered first equalized sample stream using a first noise predictive filter bank to generate a first set of noise sample streams;
in a second processing path parallel to the first processing path, interpolating said samples of the buffered first equalized sample stream using a second interpolation filter to generate an interpolated sample stream and filtering the interpolated sample stream using a second noise predictive filter bank to generate a second set of noise sample streams;
processing the first equalized sample stream and the second equalized sample stream to generate adapted filter coefficients for the second interpolation filter in the second processing path;
diversity combining the first and second set of noise sample streams to generate a set of combined noise sample streams; and
detecting a data sequence using the set of combined noise sample streams.

2. The method of claim 1, wherein processing the first equalized sample stream and the second equalized sample stream to generate adapted filter coefficients for the second interpolation filter in the second processing path comprises:
interpolating the first equalized sample stream using a third interpolation filter to generate a third interpolated sample stream, wherein the third interpolation filter has a same response as the second interpolation filter in the second processing path;
generating error signals by subtracting samples of the third interpolated sample stream from samples of the second equalized sample stream;
generating the adapted filter coefficients using the error signals; and
transferring the adapted filter coefficients to the second interpolation filter in the second processing path.

3. The method of claim 2, wherein the adapted filter coefficients are generated using LMS (least mean squares) adaptation.

4. The method of claim 2, further comprising using the adapted filter coefficients of the second interpolation filter to adapt the third interpolation filter.

5. The method of claim 1, further comprising processing the second equalized sample stream to generate adapted noise predictive filter coefficients for the second noise predictive filter bank in the second processing path.

6. The method of claim 5, wherein processing the second equalized sample stream to generate adapted noise predictive filter coefficients for the second noise predictive filter bank in the second processing path, comprises:
interpolating the second equalized sample stream using a fourth interpolation filter to generate a fourth interpolated sample stream, wherein the fourth interpolation filter has a same response as the second interpolation filter in the second processing path;
generating the adapted noise predictive filter coefficients using the fourth interpolated sample stream; and
transferring the adapted noise predictive filter coefficients to the second noise predictive filter bank in the second processing path.

7. The method of claim 6, further comprising adapting the fourth interpolation filter using the adapted filter coefficients of the second interpolation filter.

8. The method of claim 1, further comprising generating adapted filter coefficients for the second equalization filter, wherein generating the adapted filter coefficients for the second equalization filter comprises:
convolving early detector decisions with a target response of the second equalization filter;

subtracting results of the convolving from samples of the second equalized sample stream to generate error signals; and generating the adapted filter coefficients for the second equalization filter using the error signals and the second sample stream.

9. The method of claim 1, wherein filtering samples of the buffered first equalized sample stream using a first noise predictive filter bank to generate a first set of noise sample streams comprises filtering the samples of the buffered first equalized sample stream using a first set of noise predictive finite impulse response filters, wherein each noise predictive finite impulse response filter performs noise predictive filtering on the buffered first equalized sample stream to yield a first noise sample stream for a corresponding data pattern;

wherein filtering the interpolated sample stream using a second noise predictive filter bank to generate a second set of noise sample streams comprises filtering the samples of the interpolated sample stream using a second set of noise predictive finite impulse response filters, wherein each noise predictive finite impulse response filter performs noise predictive filtering on the interpolated sample stream to yield a second noise sample stream for each corresponding data pattern.

10. The method of claim 1, wherein the analog signal is an analog read channel signal containing data read from a storage disk.

11. A circuit for detecting a data sequence, comprising:
an analog-to-digital converter to generate a first sample stream, wherein the first sample stream is a time-sequenced digital signal associated with samples of an analog signal;
a first equalization filter to equalize the first sample stream and generate a first equalized sample stream;
a buffer to temporarily store the first equalized sample stream;
a first interpolation filter to interpolate the first sample stream and generate a second sample stream, wherein the second sample stream is a phase-shifted version of the first sample stream;
a second equalization filter to equalize the second sample stream and generate a second equalized sample stream;
a first processing path comprising a first noise predictive filter bank to filter samples of the buffered first equalized sample stream and generate a first set of noise sample streams;
a second processing path parallel to the first processing path, comprising a second interpolation filter to interpolate said samples of the buffered first equalized sample stream and generate an interpolated sample stream, and a second noise predictive filter bank to filter the interpolated sample stream and generate a second set of noise sample streams;
a first adaptation circuit to process the first equalized sample stream and the second equalized sample stream and generate adapted filter coefficients for the second interpolation filter in the second processing path;
an adder circuit to diversity combine the first and second set of noise sample streams and generate a set of combined noise sample streams; and
a detector to detect a data sequence using the set of combined noise sample streams.

12. The circuit of claim 11, wherein the first adaptation circuit comprises:
a third interpolation filter to interpolate the first equalized sample stream and generate a third interpolated sample stream, wherein the third interpolation filter has a same response as the second interpolation filter in the second processing path;
an adder circuit to generate error signals by subtracting samples of the third interpolated sample stream from samples of the second equalized sample stream; and
a first adaptation engine to generate the adapted filter coefficients using the error signals and transfer the adapted filter coefficients to the second interpolation filter in the second processing path.

13. The circuit of claim 12, wherein the first adaptation engine uses LMS (least mean squares) adaptation to generated the adapted filter coefficients.

14. The circuit of claim 12, wherein the adapted filter coefficients of the second interpolation filter are further used to adapt the third interpolation filter.

15. The circuit of claim 11, further comprising a second adaptation circuit to process the second equalized sample stream and generate adapted noise predictive filter coefficients to adapt the second noise predictive filter bank in the second processing path.

16. The circuit of claim 15, wherein the second adaptation circuit comprises:
a fourth interpolation filter to interpolate the second equalized sample stream and generate a fourth interpolated sample stream, wherein the fourth interpolation filter has a same response as the second interpolation filter in the second processing path; and
a second adaptation engine to generate the adapted noise predictive filter coefficients by processing the fourth interpolated sample stream, and to transfer the adapted noise predictive filter coefficients to the second noise predictive filter bank in the second processing path.

17. The circuit of claim 16, wherein the fourth interpolation filter is adapted using the adapted filter coefficients of the second interpolation filter.

18. The circuit of claim 11, further comprising a third adaptation circuit to generate adapted filter coefficients for the second equalization filter, wherein the third adaptation circuit comprises:
a circuit for convolving early detector decisions with a target response of the second equalization filter;
an adder circuit to subtract results of the convolving from samples of the second equalized sample stream to generate error signals; and
a third adaptation engine to generate the adapted filter coefficients for the second equalization filter using the error signals and the second sample stream.

19. The circuit of claim 11, wherein the first and second noise predictive filter banks each comprises a noise predictive finite impulse response filter bank, wherein each noise predictive finite impulse response filter in the first noise predictive filter bank performs noise predictive filtering on the buffered first equalized sample stream to yield a first noise sample stream for a corresponding data pattern, and wherein each noise predictive finite impulse response filter in the second noise predictive filter bank performs noise predictive filtering on the interpolated sample stream to yield a second noise sample stream for each corresponding data pattern.

20. A read channel integrated circuit comprising the circuit of claim 11, wherein the analog signal is an analog read channel signal containing data read from a storage disk.

21. A storage device comprising:
a storage medium;
a read head configured to read data from the storage medium; and control circuitry coupled to the read head and configured to process data received from the read head;

the control circuitry comprising the circuit of claim 11.

22. A virtual storage system comprising the storage device of claim 21.

* * * * *